United States Patent
Xiao et al.

(10) Patent No.: US 8,873,187 B1
(45) Date of Patent: Oct. 28, 2014

(54) SYSTEMS AND METHODS FOR DATA PROCESSOR MARGINALIZATION BASED UPON BIT ERROR RATE

(71) Applicant: LSI Corporation, San Jose, CA (US)

(72) Inventors: Jun Xiao, Fremont, CA (US); Shu Li, San Jose, CA (US); Fan Zhang, Milpitas, CA (US); Lu Lu, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/893,693

(22) Filed: May 14, 2013

Related U.S. Application Data

(60) Provisional application No. 61/822,117, filed on May 10, 2013.

(51) Int. Cl.
  G11B 5/035 (2006.01)
  G11B 20/10 (2006.01)
  G11B 27/36 (2006.01)
  G11B 20/18 (2006.01)
  G06F 11/07 (2006.01)

(52) U.S. Cl.
  CPC ............ *G06F 11/0751* (2013.01); *G11B 20/18* (2013.01)
  USPC .................................. 360/65; 360/31; 360/39

(58) Field of Classification Search
  None
  See application file for complete search history.

(56) References Cited

U.S. PATENT DOCUMENTS

| | | | |
|---|---|---|---|
| 7,064,913 B2 | 6/2006 | Gunderson et al. | |
| 7,372,651 B2 | 5/2008 | Gunderson et al. | |
| 7,570,447 B2 | 8/2009 | Koga et al. | |
| 7,990,648 B1 | 8/2011 | Wang | |
| 2003/0128448 A1 | 7/2003 | Gunderson et al. | |
| 2004/0003724 A1 | 1/2004 | Ellis | |
| 2005/0117263 A1 | 6/2005 | Seigler | |
| 2005/0201003 A1 | 9/2005 | Shishida et al. | |
| 2010/0211803 A1 | 8/2010 | Lablans | |
| 2013/0047053 A1 | 2/2013 | Jin et al. | |
| 2013/0191618 A1* | 7/2013 | Yang et al. | 712/220 |

OTHER PUBLICATIONS

U.S. Appl. No. 13/722,207, filed Dec. 20, 2012, Singleton, Jefferson, et al.
U.S. Appl. No. 13/784,369, filed Mar. 4, 2013, Jun Xiao, Unpublished.
U.S. Appl. No. 13/722,207, filed Dec. 20, 2012, Jefferson E. Singleton, Unpublished.
U.S. Appl. No. 13/710,351, filed Dec. 10, 2012, Lu Lu, Unpublished.
U.S. Appl. No. 13/686,164, filed Nov. 27, 2012, George Mathew, Unpublished.

* cited by examiner

*Primary Examiner* — Regina N Holder
(74) *Attorney, Agent, or Firm* — Hamilton DeSanctis & Cha

(57) ABSTRACT

Systems, methods, devices, circuits for data processing, and more particularly to data processing including operational marginalization capability, and/or operational improvement capability.

20 Claims, 4 Drawing Sheets

SYSTEMS AND METHODS FOR DATA PROCESSOR MARGINALIZATION BASED UPON BIT ERROR RATE

CROSS REFERENCE TO RELATED APPLICATION

The present application claims priority to U.S. Pat. App. No. 61/822,117 entitled "Systems and Methods for Data Processor Marginalization Based Upon Bit Error Rate" and filed on May 10, 2013 by Xiao et al. The entirety of each of the aforementioned reference is incorporated herein by reference for all purposes.

FIELD OF THE INVENTION

Embodiments are related to systems and methods for data processing, and more particularly to systems and methods for controlled degradation of a data processing system.

BACKGROUND

Various data transfer systems have been developed including storage systems, cellular telephone systems, radio transmission systems. In each of the systems data is transferred from a sender to a receiver via some medium. For example, in a storage system, data is sent from a sender (i.e., a write function) to a receiver (i.e., a read function) via a storage medium. The data processing includes application of various data processing algorithms to recover originally written data. Such processing results in a very small number of errors that in some cases are due to corruption of the originally received data. Such a level of errors make it difficult to make adjustments to either correct for the type of errors or make it difficult to characterize the quality of a device.

Hence, for at least the aforementioned reasons, there exists a need in the art for advanced systems and methods for data processing.

SUMMARY

Embodiments are related to systems and methods for data processing, and more particularly to systems and methods for controlled degradation of a data processing system.

Various embodiments of the present invention provide data processing systems that include: a signal modification circuit, and a processing circuit. The signal modification circuit is operable to: receive a data input; generate an adjusted scalar value based at least in part on a bit error rate; multiply a component of the data input by the adjusted scalar to yield a product; subtract the product from the data input to yield a modified output; and select one of the data input and the modified output as a processing input. The processing circuit is operable to apply a data processing algorithm to the processing input to yield a data output. The bit error rate is generated by the processing circuit.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Figure 1:
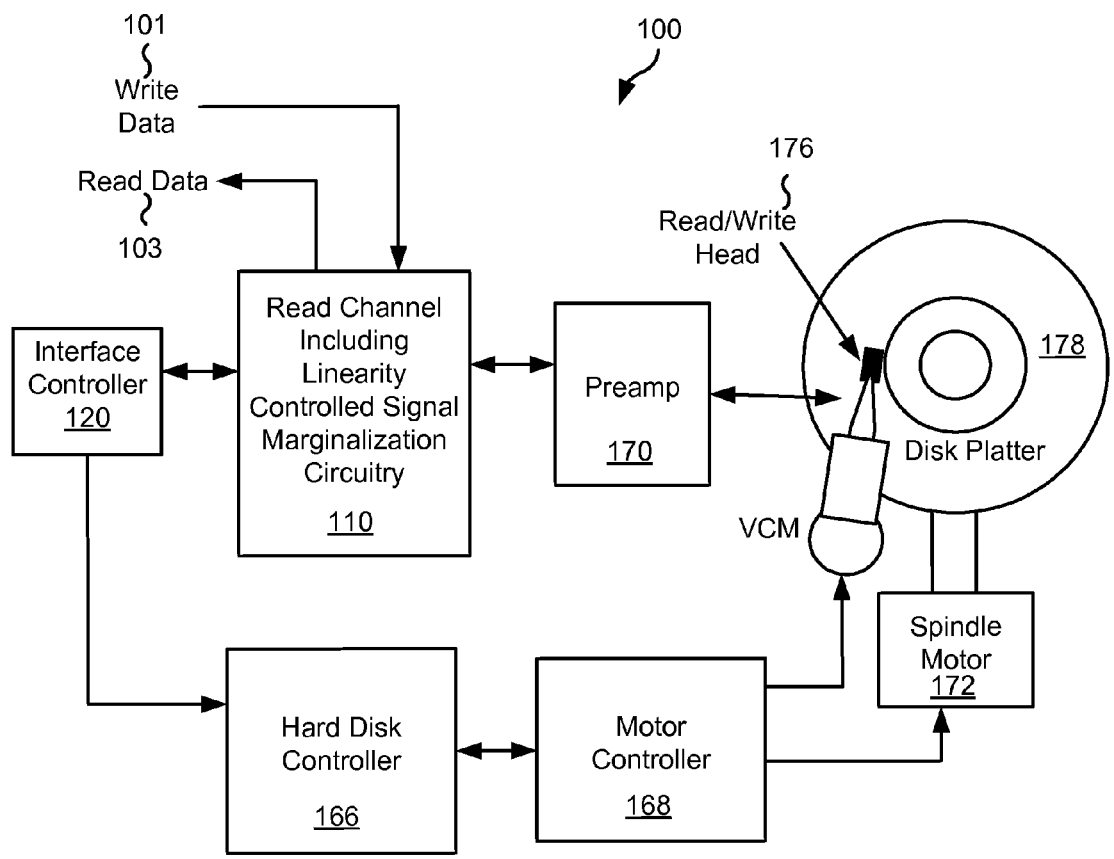
FIG. 1 shows a storage system including linearity controlled signal marginalization circuitry in accordance with various embodiments of the present invention.

Embodiments are related to systems and methods for data processing, and more particularly to systems and methods for controlled degradation of a data processing system.

One way to degrade a signal is to reduce the signal component relative to the noise component. This may be done by scaling one or both of the signal and noise component to achieved the desired degraded signal. In some cases, such an approach to signal degradation results in a non-linearity in the signal to noise ratio verses the applied noise scaling. This non-linearity makes the signal degradation less predictable, and renders the degraded signal less useful for testing purposes when compared with a degraded signal that does not exhibit the non-linearity.

Various embodiments of the present invention provide data processing systems that include linearity controlled signal marginalization circuitry. Such linearity controlled signal marginalization circuitry includes a bit error rate, and a Beta value that is fed back into a scaled signal or scaled noise component to yield a marginalized signal. The Beta value compensates for at least some of the non-linearity in the marginalized signal as a function of the bit error rate. In some cases, the Beta value is combined with a non-adjusted scalar value to yield a linearity adjusted scalar value. This linearity adjusted scalar value may then be used to scale one or both of the signal component or noise component of a signal to yield the marginalized signal. In some cases, the non-adjusted scalar value is a user programmable value that is used to select the magnitude of the signal marginalization that is to be achieved.

Various embodiments of the present invention provide data processing systems that include: a signal modification circuit, and a processing circuit. The signal modification circuit is operable to: receive a data input; generate an adjusted scalar value based at least in part on a bit error rate; multiply a component of the data input by the adjusted scalar to yield a product; subtract the product from the data input to yield a modified output; and select one of the data input and the modified output as a processing input. The processing circuit is operable to apply a data processing algorithm to the processing input to yield a data output. The bit error rate is generated by the processing circuit. In some cases, the component of the data input is a noise component of the data input. In other cases, the component of the data input is a signal component of the data input. In various instances of the aforementioned embodiments, the system is implemented as an integrated circuit. In one or more instances of the aforementioned embodiments, the data processing system is implemented as part of a storage device. In other instances of the aforementioned embodiments, the data processing system is implemented as part of a communication device.

In some instances of the aforementioned embodiments, the signal modification circuit is further operable to: receive a non-adjusted scalar value, and receive a compensation value. In some such instances, the non-adjusted scalar value is programmable. In some cases, generating the adjusted scalar value includes calculating the adjusted scalar value in accordance with the following equation:

$$\alpha' = \alpha + 2\alpha\beta(1+\alpha)^2 BER,$$

where $\alpha$ is the non-adjusted scalar value, $\alpha'$ is the adjusted scalar value, $\beta$ is the Beta value, and BER is the bit error rate.

In one or more instances of the aforementioned embodiments, the data processing system further includes: an equalizer circuit operable to equalize a sample set to yield the data input; a data detector circuit operable to apply a data detection algorithm to the data input to yield a detected output; and a data decoder circuit operable to apply a data decode algorithm to a decoder input derived from the detected output to yield the data output. In various instances of the aforementioned embodiments, the signal modification circuit includes: a partial response target filter circuit operable to filter the data input to yield the component of the data input; a multiplier circuit operable to multiply the component of the data input by the adjusted scalar value to yield the product; and summation circuit operable to subtract the product from the data input to yield the modified output.

Turning to FIG. 1, a storage system 100 including a read channel circuit 110 having linearity controlled signal marginalization circuitry in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

As part of a device characterization process, read channel circuit 110 selects a test control causing a reduction in a signal component relative to a noise component of an input derived from disk platter 178 or an increase in a noise component relative to a signal component of the input derived from disk platter 178 to yield a marginalized signal. The process of reducing the signal component or increasing the noise component includes multiplication by a linearity adjusted scalar value. The linearity adjusted scalar value is generated as a combination of a non-adjusted scalar value and a Beta value designed to deal with non-linearities resulting from multiplication by the non-adjusted scalar value directly. In some cases, the read channel circuit may include circuitry similar to that discussed in relation to FIG. 3 below; and/or may operate similar to the methods discussed below in relation to FIGS. 4a-4b.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platted 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2:
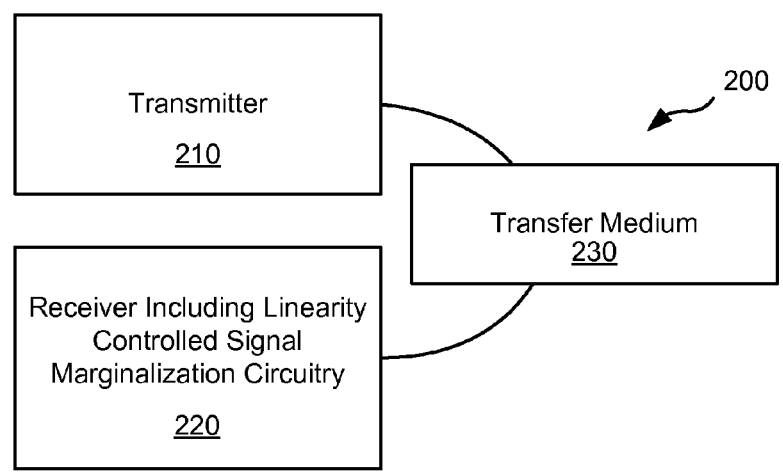
FIG. 2 depicts a data transmission system including linearity controlled signal marginalization circuitry in accordance with one or more embodiments of the present invention.

Turning to FIG. 2, a data transmission system 200 including a receiver 220 having linearity controlled signal marginalization circuitry is shown in accordance with various embodiments of the present invention. Data transmission system 200 includes a transmitter 210 that is operable to transmit encoded information via a transfer medium 230 as is known in the art. The noisy version of the encoded data is received from transfer medium 230 by a receiver 220. Receiver 220 processes the received input to yield the originally transmitted data.

As part of a device characterization process, receiver 220 selects a test control causing a reduction in a signal component relative to a noise component of an input derived from transfer medium 230 or an increase in a noise component relative to a signal component of the input derived from transfer medium 230 to yield a marginalized signal. The process of reducing the signal component or increasing the noise component includes multiplication by a linearity adjusted scalar value. The linearity adjusted scalar value is generated as a combination of a non-adjusted scalar value and a Beta value designed to deal with non-linearities resulting from multiplication by the non-adjusted scalar value directly. In some cases, the read channel circuit may include circuitry similar to that discussed in relation to FIG. 3 below; and/or may operate similar to the methods discussed below in relation to FIGS. 4a-4b.

Figure 3:
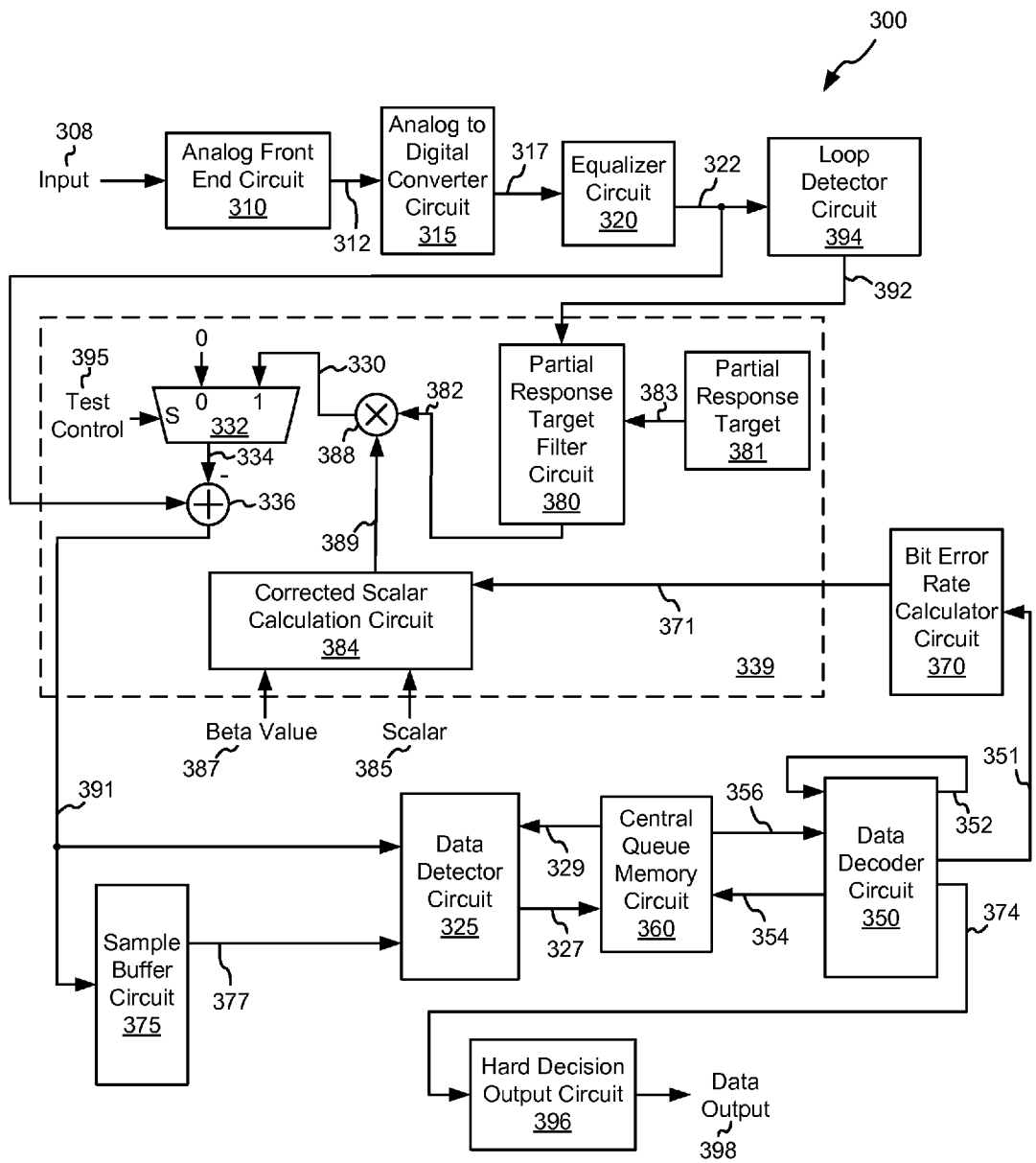
FIG. 3 shows a data processing circuit including a linearity controlled signal marginalization circuit in accordance with some embodiments of the present invention.

FIG. 3 shows a data processing circuit 300 including a linearity controlled signal marginalization circuit 339 in accordance with some embodiments of the present invention. Data processing circuit 300 includes an analog front end circuit 310 that receives an analog signal 308. Analog front end circuit 310 processes analog signal 308 and provides a processed analog signal 312 to an analog to digital converter circuit 315. Analog front end circuit 310 may include, but is not limited to, an analog filter and an amplifier circuit as are known in the art. Based upon the disclosure provided herein, one of ordinary skill in the art will recognize a variety of circuitry that may be included as part of analog front end circuit 310. In some cases, analog input signal 308 is derived from a read/write head assembly (not shown) that is disposed in relation to a storage medium (not shown). In other cases, analog input signal 308 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input signal 308 may be derived.

Analog to digital converter circuit 315 converts processed analog signal 312 into a corresponding series of digital samples 317. Analog to digital converter circuit 315 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 317 are provided to an equalizer circuit 320. Equalizer circuit 320 applies an equalization algorithm to digital samples 317 to yield an equalized output 322 (y[n]). In some embodiments of the present invention, equalizer circuit 320 is a digital finite impulse response filter circuit as are known in the art. It may be possible that equalized output 322 may be received directly from a storage device in, for example, a solid state storage system. In such cases, analog front end circuit 310, analog to digital converter circuit 315 and equalizer circuit 320 may be eliminated where the data is received as a digital data input.

Equalized output 322 is provided to linearity controlled signal marginalization circuit 339 that operates to reduce a signal component of equalized output 322 while leaving a noise component of equalized output substantially unchanged. It should be noted that while signal marginalization is discussed as reducing a signal component relative to a noise component, a similar result may be achieved in accordance with other embodiments of the present invention by increasing the noise component relative to the signal component. Linearity controlled signal marginalization circuit 339 includes a partial response target filter circuit 380, a multiplier circuit 388, a selector circuit 332, a summation circuit 336, and a corrected scalar calculation circuit 384. Operation of partial response target filter 380 is governed by a PR Target 383 from a partial response target 381. Partial response target 381 may be either fixed or user programmable.

In operation, partial response target filter circuit 380 receives a detected output 392 (â[n]) from a loop detector circuit 394 that is more fully described below. Detected output 392 is a representation, and is derived from, the data from which analog signal 308 was derived. Partial response target filter circuit 380 may be any circuit known in the art that is capable of applying target based filtering to an input signal to yield an output conformed to a target. In this case, partial response target filter circuit 380 applies target filtering to detected output 392 to yield a target filtered output 382. Target filtered output 382 is an ideal approximation of equalized output 322. Said another way, target filtered output 382 represents a signal component of equalized output 322.

Target filtered output 382 is provided to multiplier circuit 388 where it is multiplied by a linearity adjusted scalar value 389 to yield a product 330. Linearity adjusted scalar value 389 is generated by corrected scalar calculation circuit 384. Corrected scalar calculation circuit 384 calculates linearity adjusted scalar value 389 based upon a combination of a non-adjusted scalar value 385, a Beta value 387, and a bit error rate (BER) 371. In some embodiments of the present invention, non-adjusted scalar value 385 is a user programmable value that is used to control the level of degradation in a marginalized signal. Where linearity adjusted scalar value 389 is set equal to non-adjusted scalar value 385, a non-linearity occurs in product 330 that reduces the accuracy. Beta value 387 is set to mitigate the non-linearity. In some embodiments of the present invention, Beta value 387 is a user programmable value. In other embodiments of the present invention, Beta value 387 is a fixed value.

Product 330 is provided to selector circuit 332. When a test control 395 is asserted to indicate that test data is selected, product 330 is provided by selector circuit 332 as a signal reduction component 334 (q[n]). Otherwise, when test control 395 is asserted to indicate standard processing, a zero value '0' is provided by selector circuit 332 as signal reduction component 334. Test control 395 may be user programmable. Test control 395 may be asserted to indicate that test data is selected when a user desires to test operation of data processing circuit 300. Test control 395 may be de-asserted to indicate that standard data is selected when a user desires standard operation of data processing circuit 300. Signal reduction component 334 is provided to summation circuit 336 where it is subtracted from equalized output 322 to yield marginalized output 391. Where standard operation of data processing circuit 300 is selected by test control 395, marginalized output 391 is equalized output 322 unmodified.

Based upon â[n] (detected output 392), ê[n] is an estimated error between equalized output 322 and detected output 392, and g[k] is PR target 383. In such a case, product 330 may be represented by the following equation where linearity adjusted scalar value 389 is set equal to non-adjusted scalar value 385 ($\alpha$):

product 330=equalized output 322+$\alpha$(target filtered output 382).

This preceding equation may be represented as the following:

$$\text{product } 330 = \text{equalized } ouput\ 332 + \alpha\left(\text{equalized } ouput\ 322 - \sum_k \hat{a}[n-k]g[k]\right);$$

$$\text{product } 330 = (1+\alpha)\left(\sum_k \hat{a}[n-k]g[k] + \hat{e}[n]\right) - \alpha\left(\sum_k \hat{a}[n-k]g[k]\right);$$

$$\text{product } 330 = \sum_k (\hat{a}[n-k]g[k] + \alpha s[n-k])g[k] + (1+\alpha)\hat{e}[n],$$

where $s[n] = a[n] - \hat{a}[n].$

In the aforementioned equation, the $\alpha s[n-k]$ component corresponds to signal enhancement due to a loop bit error. In this case, the following probabilities hold:

$$s[n] = \begin{cases} 0, & 1-BER \\ 2, & \frac{BER}{2}, \quad a[n]=1 \\ -2, & \frac{BER}{2}, \quad a[n]=-1 \end{cases} \quad a[n]+as[n] = \begin{cases} +1, & 0.5(1-BER) \\ +1+2a, & \frac{BER}{2} \\ -1, & 0.5(1-BER) \\ -1-2a, & \frac{BER}{2} \end{cases}$$

where BER corresponds to bit error rate 371. Thus, the following holds:

var($a[n]+\alpha s[n]$)=0.5(1-BER)(1²+-1)²)+2×0.5BER (1+2$\alpha$)²;and var($a[n]+\alpha s[n]$)=1+4$\alpha$BER(1+$\alpha$).

Thus, where $-20 \log_{10} (1+\alpha)$ noise, the signal power increases to:

$q dB(\alpha, BER) = 10 \log_{10}(1+4\alpha BER(1+\alpha)).$

Based upon this, the following conditions occur:
CASE 1: Loop decision is correct, s[n]=0, the noise is properly scaled without the previously mentioned non-linearity.
CASE 2: Loop decision is incorrect, a[n]=1, â[n]=+1 ⇒ a[n]+$\alpha$s[n]=+1+2$\alpha$, which means that marginalized output 391 is moving in the correct direction by 2$\alpha$g[0].
CASE 3: Loop decision is incorrect, a[n]=-1, â[n]=+1, similar to that described above in relation to case 2, marginalized output 391 is moving in the correct direction by 2$\alpha$g[0].

Therefore, due to the incorrect loop decisions, scaling by non-adjusted scalar value 385 alone favors every incorrect bit over correct bits.

To mitigate the effect of favoring incorrect bits over correct bits, corrected scalar calculation circuit 384 incorporates Beta value 387 with non-adjusted scalar value 385 to yield linearity adjusted scalar value 389. Where it is desired to eliminate the non-linearity, the following holds where $\alpha$ is the desired noise scaling (i.e., non-adjusted scalar value 385), $\alpha$ is the corrected noise scaling (i.e., linearity adjusted scalar value 389), and $\beta$ is Beta value 387:

$-20 \log(1+\alpha) = -20 \log(1+\alpha') + q_{dB}(\alpha',\beta,BER).$

From the preceding, linearity adjusted scalar value 389 can be calculated as follows:

$\alpha' = -1 + m + \sqrt{m^2 - 2(1+\alpha)^2 m + (1+\alpha)^2/1 - 2m},$ where m=2$\beta$(1+$\alpha$)² BER. By applying a Taylor expansion for the preceding equation around BER=0, the following is achieved:

$\alpha' = \alpha + 2\alpha\beta(1+\alpha)^2 BER + 2\alpha\beta^2(3\alpha+2)(1+\alpha)^3 BER^2 + O(BER^3);$ $\alpha' = \alpha + 2\alpha\beta(1+\alpha)^2 BER + O(BER^2);$ and $\alpha' \approx \alpha + 2\alpha\beta(1+\alpha)^2 BER.$ Thus, to correct the non-linearity, corrected scalar calculation circuit 384 calculates linearity adjusted scalar value 389 in accordance with the following equation:

linearity adjusted scalar value 389=non-adjusted scalar value 385+2(non-adjusted scalar value 385)(Beta Value 387)(1+(non-adjusted scalar value 385))²BER Equalized output 322 is also provided to loop detector circuit 394. Loop detector circuit 394 may be any circuit known in the art that applies some type of algorithm designed to return a representation of the data from which analog signal 308 was derived. In one particular embodiment of the present invention, loop detector circuit 394 is operable to determine timing feedback and other operations designed to align the sampling of analog to digital converter circuit 315 with the received data set, and/or to adjust a gain applied by analog front end circuit 310. Based upon the disclosure provided herein, one of ordinary skill in the art will recognize a variety of circuits capable of providing a representation of the data from which analog signal 308 was derived that may be used in relation to different embodiments of the present invention.

In addition, marginalized output 391 is stored to a sample buffer circuit 375 that includes sufficient memory to maintain one or more codewords until processing of that codeword is completed through data detector circuit 325 and a data decoder circuit 350 including, where warranted, multiple "global iterations" defined as passes through both data detector circuit 325 and data decoder circuit 350 and/or "local iterations" defined as passes through data decoding circuit 350 during a given global iteration. Sample buffer circuit 375 stores the received data as buffered data 377.

Data detector circuit 325 is a data detector circuit capable of producing a detected output 327 by applying a data detection algorithm to a data input. As some examples, the data detection algorithm may be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention. Data detector circuit 325 may provide both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 327 is provided to a central queue memory circuit 360 that operates to buffer data passed between data detector circuit 325 and data decoder circuit 350. When data decoder circuit 350 is available, data decoder circuit 350 receives detected output 327 from central queue memory 360 as a decoder input 356. Data decoder circuit 350 applies a data decoding algorithm to decoder input 356 in an attempt to recover originally written data. The result of the data decoding algorithm is provided as a decoded output 354. Similar to detected output 327, decoded output 354 may include both hard decisions and soft decisions. For example, data decoder circuit 350 may be any data decoder circuit known in the art that is capable of applying a decoding algorithm to a received input. Data decoder circuit 350 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 350 provides the result of the data decoding algorithm as a data output 374. Data output 374 is provided to a hard decision output circuit 396 where the data is reordered before providing a series of ordered data sets as a data output 398.

One or more iterations through the combination of data detector circuit 325 and data decoder circuit 350 may be made in an effort to converge on the originally written data set. As mentioned above, processing through both the data detector circuit and the data decoder circuit is referred to as a "global iteration". For the first global iteration, data detector circuit 325 applies the data detection algorithm without guidance from a decoded output. For subsequent global iterations, data detector circuit 325 applies the data detection algorithm to buffered data 377 as guided by decoded output 354. Decoded output 354 is received from central queue memory 360 as a detector input 329.

During each global iteration it is possible for data decoder circuit 350 to make one or more local iterations including application of the data decoding algorithm to decoder input 356. For the first local iteration, data decoder circuit 350 applies the data decoder algorithm without guidance from a decoded output 352. For subsequent local iterations, data decoder circuit 350 applies the data decoding algorithm to decoder input 356 as guided by a previous decoded output 352. In some embodiments of the present invention, a default of ten local iterations is allowed for each global iteration.

In addition, an output 351 from data decoder circuit 350 (or data detector circuit 330) is provided to a bit error rate calculation circuit 370. Bit error rate calculation circuit 370 calculates bit error rate (BER) 371 that is provided to corrected scalar calculation circuit 284 where it is used in calculating linearity adjusted scalar value 389 as described above. Bit error rate calculation circuit 370 may be any circuit known in the art using one or more inputs for calculating a bit error rate.

Figure 4A:
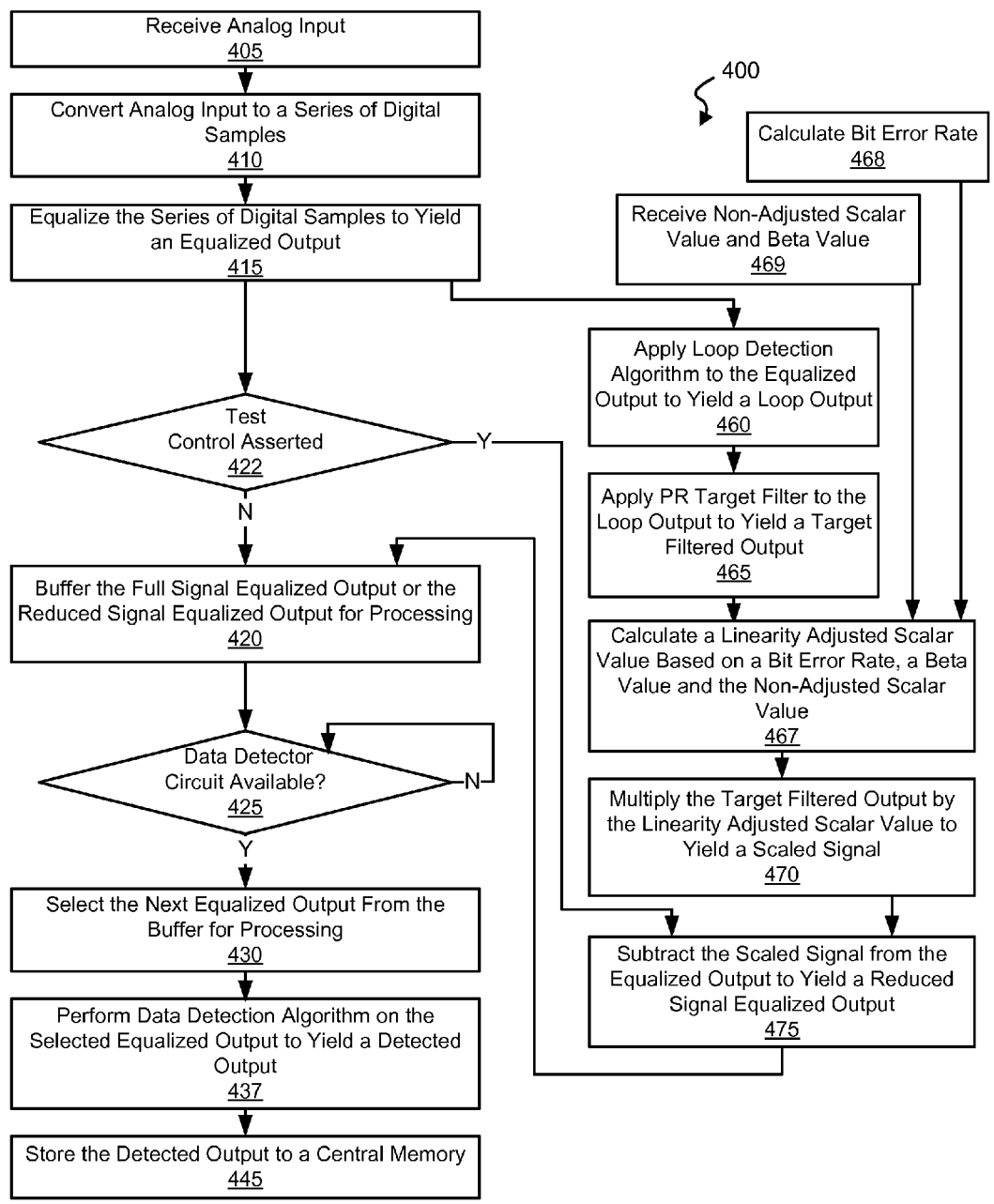
FIGS. 4a-4b are flow diagrams showing a method for data processing relying on linearity controlled signal marginalization in accordance with some embodiments of the present invention.
Figure 4B:
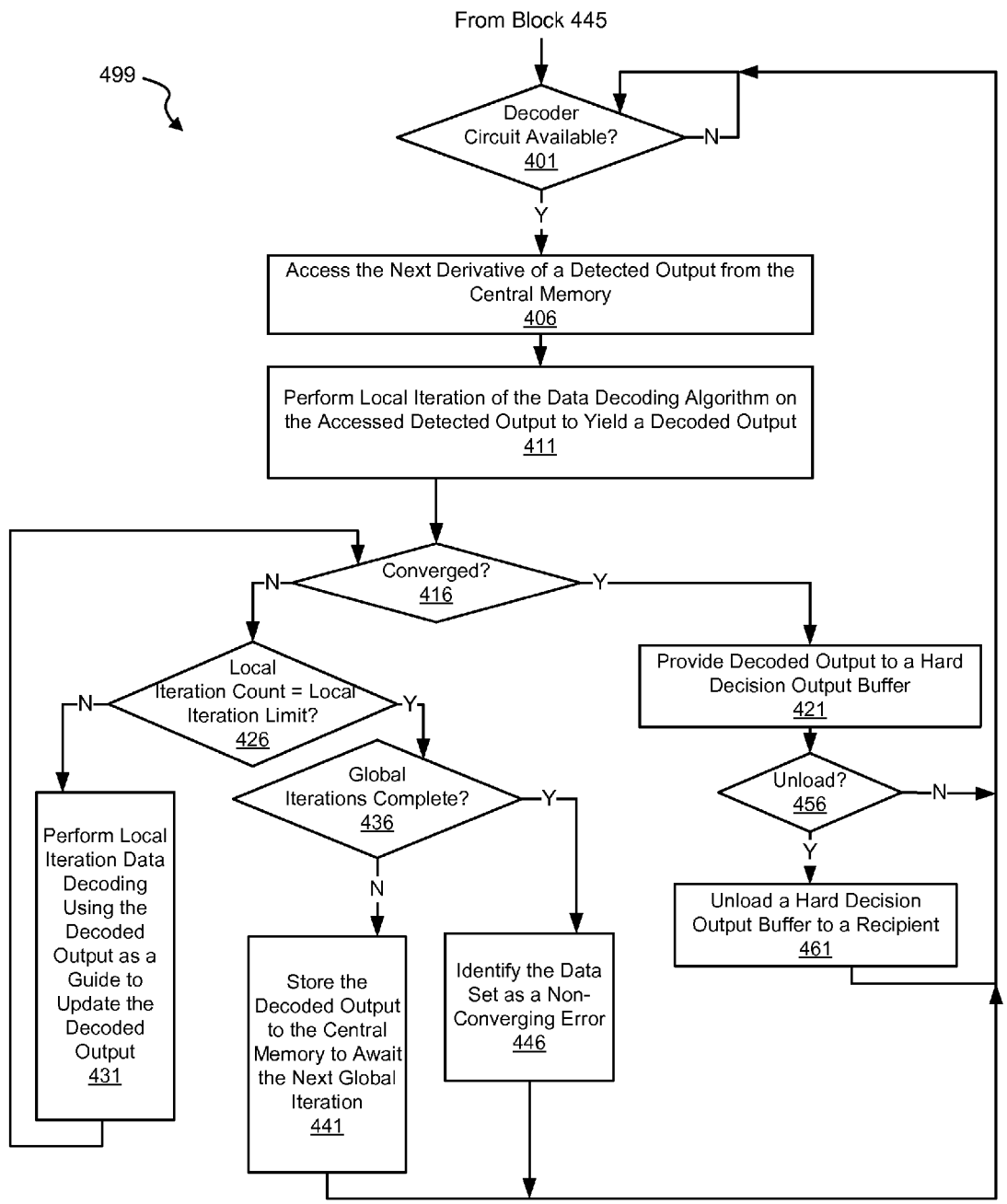

Turning to FIGS. 4a-4b are flow diagrams 400, 499 showing a method for data processing relying on signal reduction based data processor marginalization in accordance with some embodiments of the present invention. Following flow diagram 400 of FIG. 4a, an analog input is received (block 405). The analog input may be derived from, for example, a storage medium or a data transmission channel. Based upon the disclosure provided herein, one of ordinary skill in the art will recognize a variety of sources of the analog input. The analog input is converted to a series of digital samples (block 410). This conversion may be done using an analog to digital converter circuit or system as are known in the art. Of note, any circuit known in the art that is capable of converting an analog signal into a series of digital values representing the received analog signal may be used. The resulting digital samples are equalized to yield an equalized output (block 415). In some embodiments of the present invention, the equalization is done using a digital finite impulse response circuit as are known in the art. Based upon the disclosure provided herein, one of ordinary skill in the art will recognize a variety of equalizer circuits that may be used in place of such a digital finite impulse response circuit to perform equalization in accordance with different embodiments of the present invention.

A loop detection algorithm is applied to the equalized output to yield a loop output (block 460). The loop detection algorithm may be applied by any circuit known in the art that applies some type of algorithm designed to return a representation of the data from which the analog input was derived. In one particular embodiment of the present invention, the loop detection algorithm is operable to determine timing feedback and other operations designed to align the sampling related to the analog to digital conversion, and/or to adjust a gain applied by an analog front end circuit. Based upon the disclosure provided herein, one of ordinary skill in the art will recognize a variety of loop detection algorithms capable of providing a representation of the data from which the analog input was derived that may be used in relation to different embodiments of the present invention.

A partial response target filtering is applied to the loop output to yield a target filtered output (block 465). The partial response target filtering may be done by any circuit known in the art that is capable of applying target based filtering to an input signal to yield an output conformed to a target. The resulting target filtered output is an ideal approximation of the equalized output. As the data processing proceeds, a bit error rate is calculated (block 468). This bit error rate may be calculated consistent with any approach known in the art for calculating a bit error rate of a data processor. In addition, a non-adjusted scalar value and a Beta value are received (block 469). In some embodiments of the present invention, non-adjusted scalar value 385 is a user programmable value that is used to control the level of degradation in a marginalized signal. In various cases, the Beta value is a user programmable value. In some cases, the Beta value is a fixed value of eight (8).

A linearity adjusted scalar value is calculated based upon the non-adjusted scalar value ($\alpha$), the Beta value ($\beta$), and the bit error rate (BER) (block 467). In particular, the linearity adjusted scalar value is calculated in accordance with the following equation:

linearity adjusted scalar value=$\alpha+2\alpha\beta(1+\alpha)^2$BER.

The target filtered output is then multiplied by the linearity adjusted scalar value to yield a scaled signal (block 470). In some cases, the scalar value is programmable, while in other cases it is fixed. In one particular embodiment, the scalar value is less than unity (i.e., '1'), in which case, the scaled signal represents a reduced signal value.

It is determined whether a test control is asserted indicating that signal reduced test data has been selected (block 422). Where the test control is not asserted (block 422), the equalized output including the full signal (i.e., the signal component of the equalized output is not attenuated) is buffered (block 420). Alternatively, where the test control is asserted (block 422), the scaled signal is subtracted from the equalized output to yield a reduced signal equalized output (block 475), and the reduced signal equalized output is buffered (block 420).

It is determined whether a data detector circuit is available to process the buffered equalized output (block 425). Where a data detector circuit is available to process a data set (block 425), the next available equalized output from the buffer is selected for processing (block 430). A data detection algorithm is then applied to the selected equalized output to yield a detected output (block 437). The data detection algorithm may be, for example, a Viterbi algorithm data detection or a maximum a posteriori data detection algorithm. The detected output (or a derivative thereof) is then stored to a central memory (block 445).

Turning to FIG. 4b and following flow diagram 499, it is determined whether a data decoder circuit is available (block 401) in parallel to the previously described data detection process of FIG. 4a. The data decoder circuit may be, for example, a low density parity check data decoder circuit as are known in the art. Where the data decoder circuit is available (block 401) the next derivative of a detected output is selected from the central memory (block 406). The derivative of the detected output may be, for example, an interleaved (shuffled) version of a detected output from the data detector circuit. A first local iteration of a data decoding algorithm is applied by the data decoder circuit to the selected detected output to yield a decoded output (block 411). It is then determined whether the decoded output converged (e.g., resulted in the originally written data as indicated by the lack of remaining unsatisfied checks) (block 416).

Where the decoded output converged (block 416), it is provided as a decoded output codeword to a hard decision output buffer (e.g., a re-ordering buffer) (block 421). It is determined whether the received output codeword is either sequential to a previously reported output codeword in which case reporting the currently received output codeword immediately would be in order, or that the currently received output codeword completes an ordered set of a number of codewords in which case reporting the completed, ordered set of codewords would be in order (block 456). Where the currently received output codeword is either sequential to a previously reported codeword or completes an ordered set of codewords (block 456), the currently received output codeword and, where applicable, other codewords forming an in order sequence of codewords are provided to a recipient as an output (block 461).

Alternatively, where the decoded output failed to converge (e.g., errors remain) (block 416), it is determined whether the number of local iterations already applied equals the maximum number of local iterations (block 426). In some cases, a default seven local iterations are allowed per each global iteration. Based upon the disclosure provided herein, one of ordinary skill in the art will recognize another default number of local iterations that may be used in relation to different embodiments of the present invention. Where another local iteration is allowed (block 426), the data decoding algorithm is applied to the selected data set using the decoded output as a guide to update the decoded output (block 431). The processes of blocks starting at block 416 are repeated for the next local iteration.

Alternatively, where all of the local iterations have occurred (block 426), it is determined whether all of the global iterations have been applied to the currently processing data set (block 436). Where the number of global iterations has not completed (block 436), the decoded output is stored to the central queue memory circuit to await the next global iteration (block 441). Alternatively, where the number of global iterations has completed (block 436), an error is indicated and the data set is identified as non-converging (block 446).

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for out of order data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
    a signal modification circuit operable to:
        receive a data input;
        generate an adjusted scalar value based at least in part on a bit error rate;
        multiply a component of the data input by the adjusted scalar to yield a product;
        subtract the product from the data input to yield a modified output; and select one of the data input and the modified output as a processing input; and a processing circuit operable to apply a data processing algorithm to the processing input to yield a data output, wherein the bit error rate is generated by the processing circuit.

2. The data processing system of claim 1, wherein the signal modification circuit is further operable to:
receive a non-adjusted scalar value; and
receive a compensation value.

3. The data processing system of claim 2, wherein the non-adjusted scalar value is programmable.

4. The data processing system of claim 2, wherein generating the adjusted scalar value includes calculating the adjusted scalar value in accordance with the following equation:

$$\alpha'=\alpha+2\alpha\beta(1+\alpha)^2 BER,$$

where $\alpha$ is the non-adjusted scalar value, $\alpha'$ is the adjusted scalar value, $\beta$ is a Beta value, and BER is the bit error rate.

5. The data processing system of claim 1, wherein the data processing system further comprises:
an equalizer circuit operable to equalize a sample set to yield the data input;
a data detector circuit operable to apply a data detection algorithm to the data input to yield a detected output; and
a data decoder circuit operable to apply a data decode algorithm to a decoder input derived from the detected output to yield the data output.

6. The data processing system of claim 5, wherein the data decoder circuit is a low density parity check decoder circuit.

7. The data processing system of claim 5, wherein the data detector circuit is selected from a group consisting of: a maximum a posteriori data detector circuit, and a Viterbi algorithm data detector circuit.

8. The data processing system of claim 1, wherein the signal modification circuit comprises:
a partial response target filter circuit operable to filter the data input to yield the component of the data input;
a multiplier circuit operable to multiply the component of the data input by the adjusted scalar value to yield the product; and
summation circuit operable to subtract the product from the data input to yield the modified output.

9. The data processing system of claim 1, wherein the system is implemented as an integrated circuit.

10. The data processing system of claim 1, wherein the data processing system is implemented as part of a device selected from a group consisting of: a storage device, and a communication device.

11. The data processing system of claim 1, wherein the component of the data input is a noise component of the data input.

12. The data processing system of claim 1, wherein the component of the data input is a signal component of the data input.

13. A method for data processing, the method comprising:
receiving a data set;
generating a data input, wherein the data input is a component of the data set;
generating an adjusted scalar value based at least in part on the bit error rate;
multiplying the data input by the adjusted scalar to yield a product;
subtracting the product from the data set to yield a modified output;
selecting one of the data set and the modified output as a processing input; and
applying a data processing algorithm to the modified output to yield a data output and the bit error rate.

14. The method of claim 13, wherein the method further comprises:
receiving a non-adjusted scalar value; and
receiving a compensation value.

15. The method of claim 14, wherein generating the adjusted scalar value includes calculating the adjusted scalar value in accordance with the following equation:

$$\alpha'=\alpha+2\alpha\beta(1+\alpha)^2 BER,$$

where $\alpha$ is the non-adjusted scalar value, $\alpha'$ is the adjusted scalar value, $\beta$ is a Beta value, and BER is the bit error rate.

16. The method of claim 13, wherein generating the component of the data set includes filtering the data set to yield the data input.

17. The method of claim 13, wherein the data input is a noise component of the data set.

18. The method of claim 13, wherein the data input is a signal component of the data set.

19. A storage device, the storage device comprising:
a storage medium;
a head assembly disposed in relation to the storage medium and operable to provide a sensed signal corresponding to a data set on the storage;
a read channel circuit including:
an analog front end circuit operable to provide an analog signal corresponding to the sensed signal;
an analog to digital converter circuit operable to sample the analog signal to yield a series of digital samples;
an equalizer circuit operable to equalize the digital samples corresponding to the data set to yield a data set;
a loop detector circuit operable to apply a loop detection algorithm to the data set to yield a detected output;
a signal modification circuit operable to:
generate an adjusted scalar value based at least in part on a bit error rate;
multiply a component of the detected output by the adjusted scalar to yield a product;
subtract the product from the data set to yield a modified output; and
select one of the data set and the modified output as a processing input; and
a processing circuit operable to apply a data processing algorithm to the processing input to yield a data output, wherein the bit error rate is generated by the processing circuit.

20. The storage device of claim 19, wherein the signal modification circuit is further operable to:
receive a non-adjusted scalar value;
receive a compensation value; and
wherein generating the adjusted scalar value includes calculating the adjusted scalar value in accordance with the following equation:

$$\alpha'=\alpha+2\alpha\beta(1+\alpha)^2 BER,$$

where $\alpha$ is the non-adjusted scalar value, $\alpha'$ is the adjusted scalar value, $\beta$ is a Beta value, and BER is the bit error rate.

* * * * *